United States Patent
Takahashi

(10) Patent No.: US 11,227,037 B2
(45) Date of Patent: Jan. 18, 2022

(54) COMPUTER SYSTEM, VERIFICATION METHOD OF CONFIDENTIAL INFORMATION, AND COMPUTER

(71) Applicant: Hitachi, Ltd., Tokyo (JP)

(72) Inventor: Kenta Takahashi, Tokyo (JP)

(73) Assignee: HITACHI, LTD., Tokyo (JP)

(*) Notice: Subject to any disclaimer, the term of this patent is extended or adjusted under 35 U.S.C. 154(b) by 279 days.

(21) Appl. No.: 16/494,652

(22) PCT Filed: Jan. 25, 2018

(86) PCT No.: PCT/JP2018/002213
§ 371 (c)(1),
(2) Date: Sep. 16, 2019

(87) PCT Pub. No.: WO2018/225291
PCT Pub. Date: Dec. 13, 2018

(65) Prior Publication Data
US 2020/0019685 A1    Jan. 16, 2020

(30) Foreign Application Priority Data
Jun. 9, 2017    (JP) .............................. JP2017-114026

(51) Int. Cl.
*G06F 21/32* (2013.01)
*H04L 9/32* (2006.01)

(52) U.S. Cl.
CPC ............ *G06F 21/32* (2013.01); *H04L 9/3231* (2013.01); *H04L 9/3242* (2013.01); *H04L 9/3247* (2013.01); *H04L 9/3252* (2013.01)

(58) Field of Classification Search
CPC ..... G06F 21/32; H04L 9/3231; H04L 9/3242; H04L 9/0866
See application file for complete search history.

(56) References Cited

U.S. PATENT DOCUMENTS

| | | | |
|---|---|---|---|
| 2002/0029341 A1 | 3/2002 | Juels et al. | |
| 2003/0140235 A1* | 7/2003 | Immega | H04L 51/30 713/186 |

(Continued)

FOREIGN PATENT DOCUMENTS

| | | |
|---|---|---|
| JP | 2002-538504 A | 11/2002 |
| JP | 2016-072836 A | 5/2016 |
| WO | 2000/051244 A1 | 8/2000 |

OTHER PUBLICATIONS

Li, P., Yang, X., Qiao, H., Cao, K., Liu, E., & Tian, J. (2012). An effective biometric cryptosystem combining fingerprints with error correction codes. Expert Systems with Applications, 39(7), 6562-6574. (Year: 2012).*

(Continued)

*Primary Examiner* — Alexander Lagor
(74) *Attorney, Agent, or Firm* — Procopio, Cory, Hargreaves & Savitch LLP

(57) ABSTRACT

A computer system comprising a computer, wherein the computer is configured to: generate feature data based on biometric information obtained from a user; generate error feature data indicating an error in the biometric information and stationary feature data indicating part other than the error in the biometric information, based on the feature data; generate a template based on the error feature data of the biometric information; generate first confidential information used for cryptographic process based on the stationary feature data of the biometric information, and generate first verification information based on the first confidential information.

12 Claims, 4 Drawing Sheets

(56) References Cited

U.S. PATENT DOCUMENTS

| | | | |
|---|---|---|---|
| 2004/0059570 A1* | 3/2004 | Mochinaga | G11B 27/105 |
| | | | 704/205 |
| 2004/0148509 A1* | 7/2004 | Wu | H04L 9/0866 |
| | | | 713/186 |
| 2010/0017618 A1 | 1/2010 | Golic et al. | |
| 2011/0099385 A1 | 4/2011 | Takahashi | |
| 2011/0205020 A1 | 8/2011 | Le Saint et al. | |
| 2012/0150450 A1 | 6/2012 | Monden | |
| 2016/0330018 A1 | 11/2016 | Miyata et al. | |
| 2017/0004352 A1* | 1/2017 | Jonsson | G06K 9/00013 |
| 2017/0222809 A1 | 8/2017 | Takahashi | |
| 2018/0150679 A1* | 5/2018 | Kim | G06K 9/00892 |
| 2020/0019685 A1* | 1/2020 | Takahashi | H04L 9/0866 |
| 2020/0184189 A1* | 6/2020 | Hansen | G06K 9/03 |

OTHER PUBLICATIONS

Sutcu, Y., Rane, S., Yedidia, J. S., Draper, S. C., & Vetro, A. (Jun. 2008). Feature transformation of biometric templates for secure biometric systems based on error correcting codes. In 2008 IEEE Computer Society Conference on Computer Vision and Pattern Recognition Workshops (pp. 1-6). IEEE. (Year: 2008).*
Extended European Search Report for related EP Application No. 18813135.3, dated Nov. 11, 2020 (11 pages).
International Search Report for related International Application No. PCT/JP2018/002213, dated May 1, 2018; 15 pages.

* cited by examiner

COMPUTER SYSTEM, VERIFICATION METHOD OF CONFIDENTIAL INFORMATION, AND COMPUTER

CROSS-REFERENCE TO RELATED APPLICATIONS

The present application is a U.S. National Stage entry of PCT Application No: No.: PCT/JP2018/002213, filed Jan. 25, 2018, which claims priority from Japanese patent application JP 2017-114026 filed on Jun. 9, 2017, the content of which is hereby incorporated by reference into this application.

BACKGROUND OF THE INVENTION

The present application claims priority of Japanese Patent Application No. 2017-114026 filed on Jun. 9, 2017, the entire content of which is incorporated herein by reference.

The present invention relates to a system configured to perform processes such as authentication, encryption, signature generation, and the like based on biometric information of a user.

Biometric authentication technology that authenticates a person based on biometric information such as fingerprints, veins, faces, and irises is widely used. In the conventional biometric authentication technology, the following processes are performed. First, in the user registration, a terminal registers feature data extracted from the biometric information of the user in a system as a template. In the user authentication, the terminal compares feature data extracted from the biometric information of the user again with the template, and if the degree of similarity is sufficiently high, or in other words, if the distance between the two pieces of feature data is sufficiently small, the terminal determines that the authentication was successfully completed, and if the degree of similarity of small, the terminal determines that the authentication has failed.

Generally, the biometric information cannot be replaced. Thus, a leak of such biometric information would cause a serious problem. In order to prevent this problem, the development of template protection biometric authentication technologies for authenticating biometric information confidentially is underway. Among such technologies, a technology called biometric encryption is drawing attention. In the biometric encryption, key data is generated from biometric information, and cryptographic authentication, encryption, decryption, and signature generation are performed.

In the biometric encryption, the terminal converts feature data X of biometric information and embeds a secret key in the data, thereby generating protected template T in the registration process of biometric information. Thereafter, the terminal restores the secret key K using feature data X' of the newly obtained biometric information and the protected template T. In a case where the secret key is successfully restored, the terminal can perform cryptographic authentication, encryption, decryption, and electronic signature generation using the secret key K.

Due to security requirements, restoration or estimation of the feature data X using the protected template T in biometric cryptography needs to be made sufficiently difficult. On the other hand, if the feature data X' is sufficiently similar to the feature data X, the restoration process of the secret key needs to be successfully performed.

For a specific method to realize the biometric cryptography, the method described in "Cryptographic Key Generation from Biometric Data Using Lattice Mapping" (Gang Zheng, et. al., In 18th International Conference on Pattern Recognition (ICPR'06), 2006) (Document 1) is proposed. In Document 1, the feature data extracted from the biometric information is the n-dimension actual number vector X as in Formula (1), and each element is allowed to have an error up to $\pm\delta$. That is, as long as an error of the value is within the range of $\pm\delta$, the person from whom the data was extracted is accepted as the user him/herself. The secret key can be represented as an integer vector as in Formula (2). Each element $s\_i$ of the secret key is a q-bit integer. The subscript "i" is a value from 1 to n, and "q" is an appropriate integer. Thus, the element $s\_i$ is an integer equal to or greater than 0, but not exceeding $2^q - 1$.

Formula 1

$$X = (x\_1, \ldots, x\_n) \qquad (1)$$

Formula 2

$$S = (s\_1, \ldots, s\_n) \qquad (2)$$

The template T of the biometric information upon registration can be represented as a vector as in Formula (3), and the element $t\_i$ is calculated based on Formula (4). The subscript "i" is a value from 1 to n.

Formula 3

$$T = (t\_1, \ldots, t\_n) \qquad (3)$$

Formula 4

$$t\_i = x\_i - \delta - 2\delta s\_i \qquad (4)$$

The feature data X' of the newly obtained biometric information can be represented as a vector as in Formula (5).

Formula 5

$$X' = (x'\_1, \ldots, x'\_n) \qquad (5)$$

When authenticating the secret key, the terminal performs calculation of Formula (7) using the stored template T and the feature data X', thereby deriving the value of each element of the secret key S' represented by Formula (6). This way, the secret key S' is restored. The subscript "i" is a value from 1 to n. In addition, the symbol "[]" represents an operation to extract an integer part by truncating a decimal part of a value in parentheses.

Formula 6

$$S = (s'\_1, \ldots, s'\_n) \qquad (6)$$

Formula 7

$$s'\_i = \frac{(x'\_i - t\_i)}{2\delta} \qquad (7)$$

In a case where Formula (8) is satisfied, the restored secret key S' coincides with the secret key S, and the terminal determines that the secret key has been correctly restored and accepts the user subjected to the authentication of the secret key as the user him/herself registered in the system.

Formula 8

$$|x'\_i - x\_i| < \delta \qquad (8)$$

Because it is not possible to uniquely obtain the feature data X and the secret key S using the template T used in Document 1, template protection having a certain degree of effects can be realized by using the method of Document 1.

SUMMARY OF THE INVENTION

The method of Document 1, however, has safety and efficiency problems.

For the safety problem, it is possible to find several candidates of the feature data X and the secret keys S using the template T. Specifically, due to the limitation that the element s_i of the secret key S is a q-bit integer, an attacker who knows of t_i can narrow down candidate of the element x_i of the feature data X to the range of Formula (9) based on Formula (4).

Formula 9

$$t\_i+\delta \leq x\_i \leq t\_i+2(2^q-1) \qquad (9)$$

Furthermore, the value of the element x_i of the feature data is within the range of Formula (10), and if the attacker knows of this range, the candidate of the element x_i can further be narrowed down to the overlapping range of Formula (9) and Formula (10).

Formula 10

$$x\_\min \leq x\_i \leq x\_\max \qquad (10)$$

For example, if the element x_i=x_max, and the element s_i=0, the element t_i takes the value represented by Formula (11), based on Formula (4). This tells the attacker who knows of the template T that the element x_i satisfies Formula (12) based on Formula (9).

Formula 11

$$t\_i = x\_i - \delta \qquad (11)$$

Formula 12

$$x\_\max \leq x\_i \qquad (12)$$

From Formula (10) and Formula (12), the range of the element x_i can be represented by Formula (13), which tells the attacker that the element x_i=x_max. Also, from Formula (4), the attacker is able to know that the element s_i=0.

Formula 13

$$x\_\max \leq x\_i \leq x\_\max \qquad (13)$$

Other than the hypothetical scenario described above, it is possible to narrow down the range of candidate of the element x_i stochastically. Thus, in order to ensure the sufficient level of safety, it is necessary to increase the value of "q" so that $2^q$ becomes large enough relative to |x_min| and |x_max|, and to generate the element s_i of the secret key S uniformly at random within the range of 0 or greater but not exceeding $2^q-1$.

If "q" is greater, however, the size of the template T would increase as well, which would cause an efficiency problem. Specifically, when the representation digit number of the decimal part of the element x_i of feature data X is "r" in binary representation, the integer part of the element t_i of the template T is q bits, and the decimal part thereof is r bits. Thus, the data size of the template T is n(q+r) bits.

When q=256, r=52 (double the mantissa part digit number), and n=1000, the data size of the template T is 38.5 KB. In a case where one template T is generated from a fingerprint of one finger, ten templates T will be generated for one user. In a case where templates T for 100 million users are registered in the system, the total data size would be 38.5 TB. In the 1:n authentication in which the authentication data is compared with all of registered N-number of templates, it is necessary to access the 38.5 TB data, and thus, the time required to access the storage area of the data would occupy the major part of the authentication process.

An object of the present invention is to improve the safety and efficiency, which has been the problems of the conventional biometric cryptographic technology. Specifically, an object thereof is to generate a template that makes it difficult to estimate feature data and that is small in size.

The present invention can be appreciated by the description which follows in conjunction with the following figures, wherein: a computer system comprises at least one computer, the at least one computer includes a processing unit, and a storage device coupled to the processing unit. The processing unit is configured to: generate first feature data based on first biometric information obtained from a user; generate error feature data indicating an error in the first biometric information and stationary feature data indicating part other than the error in the first biometric information, based on the first feature data; generate a template based on the error feature data of the first biometric information, and store, in the storage device, identification information of the user associated with the template; generate first confidential information used for a cryptographic process based on the stationary feature data of the first biometric information, generate first verification information based on the first confidential information, and store, in the storage device, the identification information of the user associated with the first verification information. The processing unit is configured to: generate second feature data based on second biometric information obtained from a user in a case where a request to perform the cryptographic process is received; generate second confidential information based on the template and the second feature data; generate second verification information based on the second confidential information; verify the second confidential information by comparing the second verification information with the first verification information; and perform the cryptographic process based on a verification result of the second confidential information.

According to the present invention, it is possible to achieve a biometric cryptographic technology that can significantly reduce the template size and that makes it difficult to estimate the feature data. Problems, configurations, and effects other than described above will become apparent from a description of an embodiment below.

BRIEF DESCRIPTION OF THE DRAWINGS

The present invention can be appreciated by the description which follows in conjunction with the following figures, wherein.

DETAILED DESCRIPTION OF THE EMBODIMENTS

Figure 1:
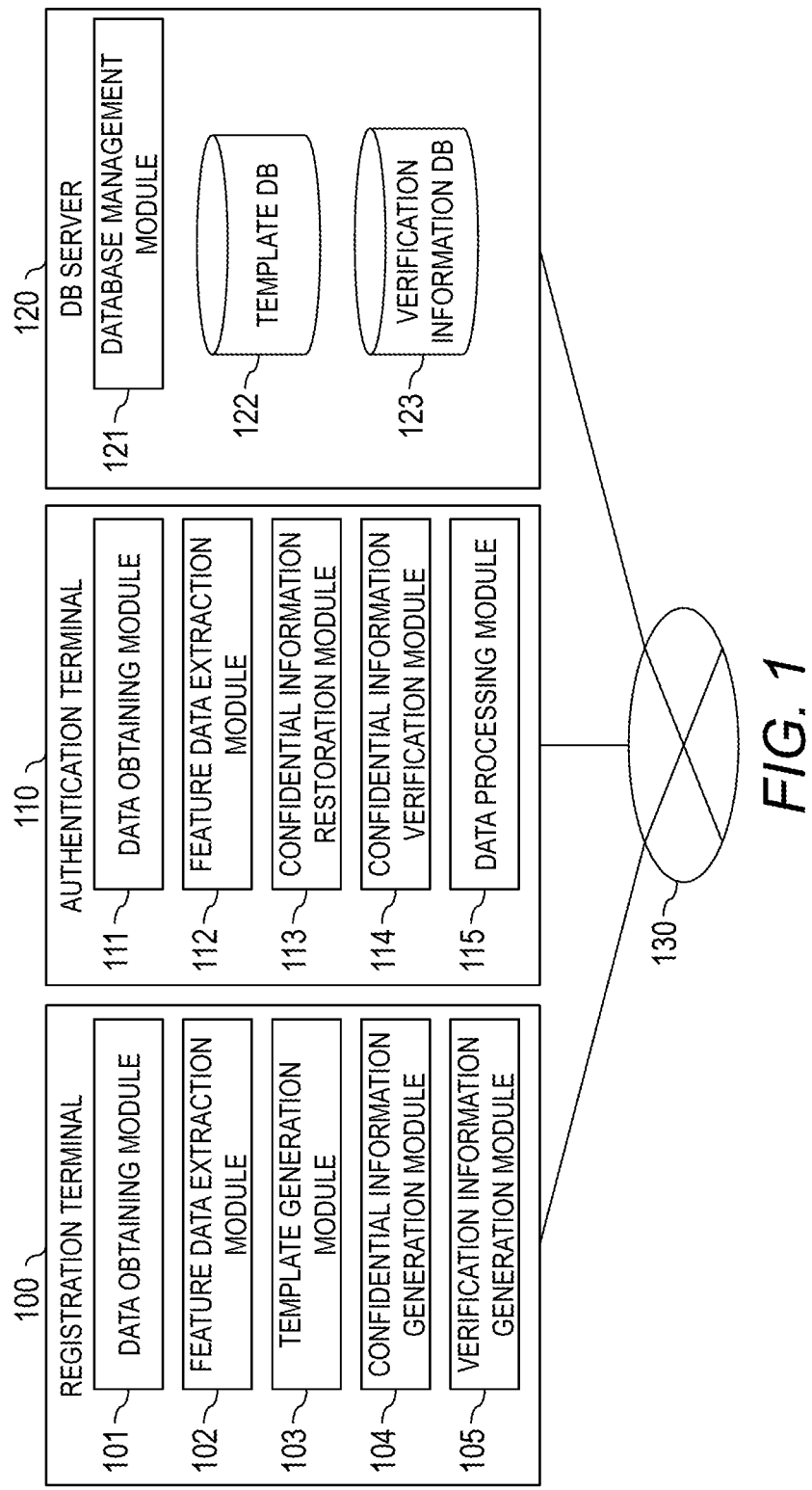
FIG. 1 is a diagram showing a configuration example of a biometric authentication system of Embodiment 1.

Now, a description is given in detail of an embodiment of this invention with reference to the drawings. Components common across the drawings are denoted by the same reference numerals.

Embodiment 1

In a biometric verification system of Embodiment 1, first, a computer included in the biometric verification system generates a template and verification information to verify restored confidential information (secret key) from the biometric information of a user, and registers the template and the verification information into a database. In a case of verifying the confidential information in the cryptographic process, the computer restores the confidential information using the registered template and newly obtained biometric information of a user. The computer also verifies the confidential information based on the restored confidential information and the verification information, and performs the cryptographic processes such as user authentication process, encryption process, decryption process, electronic signature generation process, and the like based on the verification result.

Figure 2:
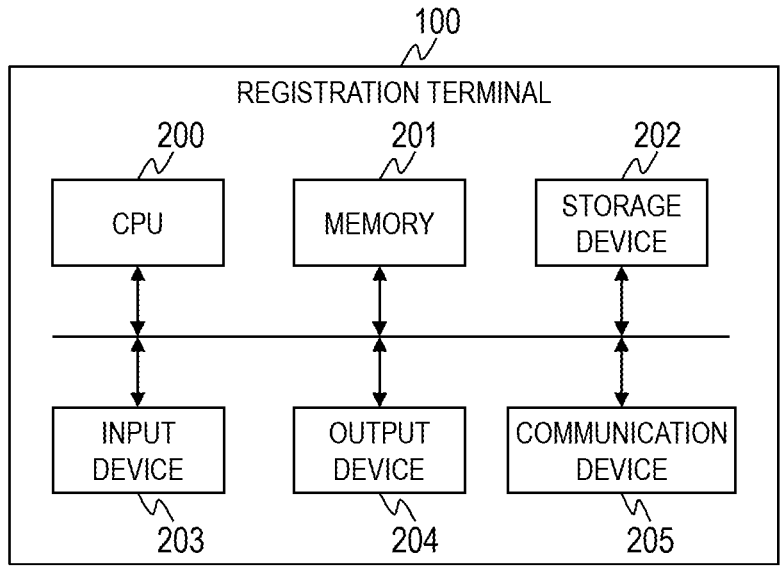
FIG. 2 is a diagram showing an example of the hardware configuration of a computer constituting the biometric authentication system of Embodiment 1.

FIG. 1 is a diagram showing a configuration example of a biometric authentication system of Embodiment 1. FIG. 2 is a diagram showing an example of the hardware configuration of a computer constituting the biometric authentication system of Embodiment 1.

The biometric authentication system is constituted of a registration terminal 100, an authentication terminal 110, a DB server 120, and network 130. The registration terminal 100, the authentication terminal 110, and the DB server 120 are connected to each other via the network 130. Example of the network 130 include Local Area Network (LAN) and Wide Area Network (WAN). In this embodiment, there is no limitation on the type of the network 130. The connection method of the network 130 may be wired connection or wireless connection.

The registration terminal 100 obtains biometric information from a user, generates a template and verification information using the biometric information, and registers the template and the verification information in the DB server 120.

Below, the hardware configuration of the registration terminal 100 will be explained. As illustrated in FIG. 2, the registration terminal 100 includes a CPU 200, a memory 201, a storage device 202, an input device 203, an output device 204, and a communication device 205. The authentication terminal 110 and DB server 120 discussed later have the same hardware configuration.

The CPU 200 is an arithmetic unit of the registration terminal 100, configured to execute programs stored in the memory 201. The CPU 200 operates as function modules that realize specific functions, respectively, by executing processes in accordance with the programs. In the descriptions below, when the process is described using a module the subject, that means that the CPU 200 is executing the program.

The memory 201 is a main storage device of the registration terminal 100 configured to store programs to be executed by the CPU 200 and data to be used by the programs. The memory 201 also includes a temporary area that each program temporarily uses.

The storage device 202 is an auxiliary storage device of the registration terminal 100 configured to store the data permanently. Examples of the storage device 202 include a hard disk drive (HDD) and a solid state drive (SSD).

The input device 203 is a device for inputting various types of data into the registration terminal 100, and includes a keyboard, a mouse, a touch panel, a sensor, and the like.

The output device 204 is a device for outputting various types of data, and includes a touch panel, a display and the like.

The communication device 205 is an interface for communicating with multiple devices through a network.

Below, the functional configuration of the registration terminal 100 will be explained. The memory 201 of the registration terminal 100 stores programs for realizing a data obtaining module 101, a feature data extraction module 102, a template generation module 103, a confidential information generation module 104, and a verification information generation module 105.

The data obtaining module 101 obtains biometric information for registration such as fingerprints, veins and the like from a user, and outputs the obtained biometric information for registration to the feature data extraction module 102.

The feature data extraction module 102 extracts feature data for registration from the biometric information for registration, and outputs the extracted feature data for registration to the template generation module 103 and the confidential information generation module 104.

The template generation module 103 generates a template based on the feature data for registration. The template generation module 103 transmits the template to the DB server 120, thereby registering the template in the template DB 122.

The confidential information generation module 104 generates confidential information based on the feature data for registration. The confidential information generation module 104 outputs the confidential information to the verification information generation module 105.

The verification information generation module 105 generates verification information for verifying confidential information restored by the authentication terminal 110 based on the confidential information. The verification information generation module 105 transmits the verification information to the DB server 120, thereby registering the verification information in the verification information DB 123.

The authentication terminal 110 obtains new biometric information from a user, restores the confidential information based on the newly obtained biometric information and the template, and verifies the restored confidential information. The authentication terminal 110 performs cryptographic processes such as user authentication, encryption, decryption, electronic signature generation, and the like based on the verification result of the restored confidential information.

Below, the functional configuration of the authentication terminal 110 will be explained. The memory 201 of the authentication terminal 110 stores programs for realizing a data obtaining module 111, a feature data extraction module 112, a confidential information restoration module 113, a confidential information verification module 114, and a data processing module 115.

The data obtaining module 111 obtains biometric information for generating confidential information from a user, and outputs the obtained biometric information to the feature data extraction module 112.

The feature data extraction module 112 extracts feature data from the biometric information, and outputs the extracted feature data to the confidential information restoration module 113.

The confidential information restoration module 113 restores confidential information based on the feature data and the template, and outputs the restored confidential information to the confidential information verification module 114.

The confidential information verification module 114 verifies the authenticity of the restored confidential information based on the verification information. That is, the confidential information verification module 114 determines whether the confidential information generated by the registration terminal 100 coincides with the restored confidential information or not.

The data processing module 115 performs cryptographic processes such as authentication, encryption, decryption, electronic signature generation, and the like using the confidential information.

The DB server 120 manages various types of data used in the biometric authentication system. The DB server 120 also performs a data registration process, a data search process, and the like.

Below, the functional configuration of the DB server 120 will be explained. The memory 201 of the DB server 120 stores a program for realizing the database management module 121, and also stores the template DB 122 and the verification information DB 123. The template DB 122 and the verification information DB 123 may alternatively be stored in the storage device 202 of the DB server 120.

The database management module 121 registers, updates, and searches for data. The template DB 122 is a database that stores templates therein. The template DB 122 stores therein at least one piece of data that associates user identification information with a template. Examples thereof include a table-format database including at least one entry constituted of a field to store identification information of a user and a field to a template.

The verification information DB 123 is a database to store verification information. The verification information DB stores therein at least one piece of data that associates user identification information with verification information. Examples thereof include a table-format databased including at least one entry constituted of a field to store identification information of a user and a field to store verification information.

In this embodiment, one DB server 120 holds the template DB 122 and the verification information DB 123, but it is also possible to manage data using a distributed database constituted of a plurality of DB servers 120. In this case, the template and the verification information are stored in the respective DB servers 120 in a distributed manner. By managing the template and the verification information in a distributed manner, the risk of information leak can be reduced, which improve data security.

Alternatively, at least one of the template DB 122 and the verification information DB 123 may be held by the authentication terminal 110. Alternatively, at least one of the template DB 122 and the verification information DB 123 may be stored in an IC card, USB memory, portable medium such as printed material in which data has been converted to QR code, or personal terminal such as a smartphone.

In this embodiment, the registration terminal 100, the authentication terminal 110, and the DB server 120 are computers physically independent of each other, but the present invention is not limited to this. A plurality of functions may be integrated into one computer. For example, the authentication terminal 110 and the DB server 120 may be realized by one computer.

As for the respective modules of the registration terminal 100, the authentication terminal 110, and the DB server 120, two or more modules may be consolidated into one module, or one module may be divided into a plurality of modules by function.

Figure 3:
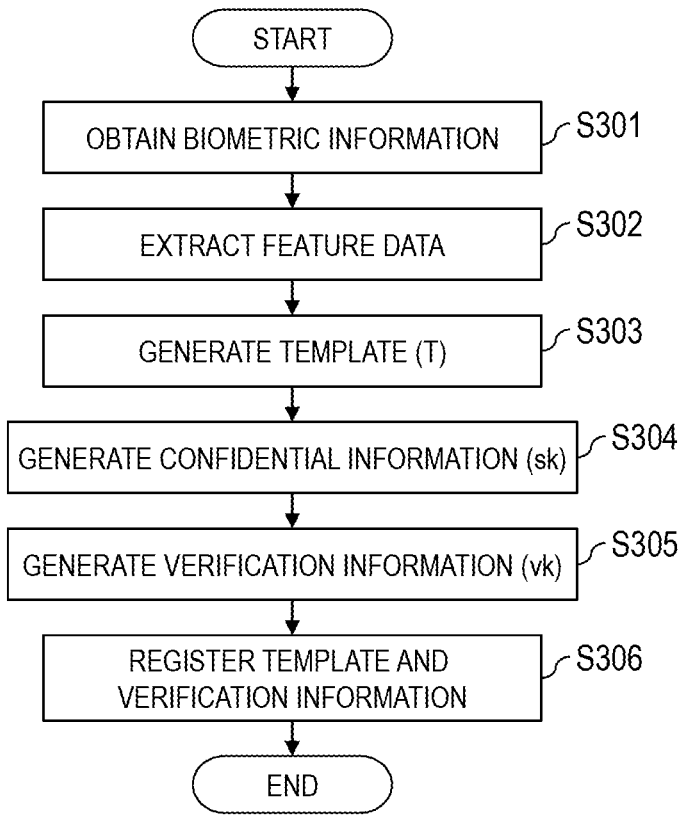
FIG. 3 is a flowchart for explaining registration process performed by a registration terminal of Embodiment 1.

Next, the registration process of Embodiment 1 will be explained in detail with reference to FIG. 3. FIG. 3 is a flowchart for explaining the registration process performed by the registration terminal 100 of Embodiment 1.

In a case of receiving an input from a user or operator, the registration terminal 100 starts the registration process described below. First, the data obtaining module 101 of the registration terminal 100 obtains biometric information for registration from the user through the input device 203 (Step S301). The data obtaining module 101 also obtains identification information of the user such as ID and name at the start of the registration process or in the process of obtaining the biometric information for registration.

Next, the feature data extraction module 102 of the registration terminal 100 extracts feature data for registration from the biometric information for registration (Step S302). For example, image and feature vector are extracted as the feature data.

Next, the template generation module 103 of the registration terminal 100 generates a template T based on the feature data for registration. The process to generate a template T will be explained in detail later.

Next, the confidential information generation module 104 of the registration terminal 100 generates confidential information sk based on the feature data for registration (Step S304). The process to generate the confidential information sk will be explained in detail later.

Next, the verification information generation module 105 of the registration terminal 100 generates verification information vk based on the confidential information sk (Step S305). Examples of the generation method for the verification information vk is described below. The following are the three possible methods to generate the verification information vk based on the confidential information sk.

(Generation Method 1) The verification information generation module 105 generates the verification information vk using an appropriate one-way function Hash( ) as in Formula (14). Examples of the one-way function Hash( ) include the cryptographic hash function such as SHA256 and SHA3.

Formula 14

$$vk = \text{Hash}(sk) \quad (14)$$

(Generation Method 2) The verification information generation module 105 generates the verification information vk using a cyclic group G=<g> and a mapping φ from a set of the confidential information sk to an integer set as in Formula (15). Here, g is a generator of G.

Formula 15

$$vk = g^{\varphi(sk)} \quad (15)$$

The generated pair (sk, vk) can be used as a secret key/public key pair in many public key cryptography/electronic signature algorithms such as ElGamal cryptography/signature, DSA, Schnorr signature, or elliptic curve algorithm of those.

(Generation method 3) The verification information generation module 105 generates the verification information vk using a function Enc( ) that uses, as a variable, the secret key for generating the verification information or a parameter "p" as in Formula (16). "p" may be set for each user or each piece biometric information for registration, or may be set for each authentication terminal 110 or each biometric authentication system.

Formula 16

$$vk = \text{Enc}(sk, p) \quad (16)$$

Examples of the function Enc( ) include an encrypted function in AES, RSA, or the like, a keyed hush function, and the like. The process of Step S305 is conducted this way.

Next, the template generation module 103 and the verification information generation module 105 of the registration terminal 100 respectively register the template T and the verification information vk in the DB server 120 (Step S306). Then, the registration terminal 100 ends the registration process.

Specifically, the template generation module 103 transmits a registration request including the user identification information and the template T to the DB server 120, and the verification information generation module 105 transmits a registration request including the user identification information and the verification information vk to the DB server 120.

In a case of receiving the registration request from the template generation module 103, the DB server 120 registers data associated with the user identification information and the template T in the template DB 122. Also, in a case of receiving the registration request from the verification information generation module 105, the DB server 120 registers data associated with the user identification information and the verification information vk in the verification information DB 123.

Figure 4:
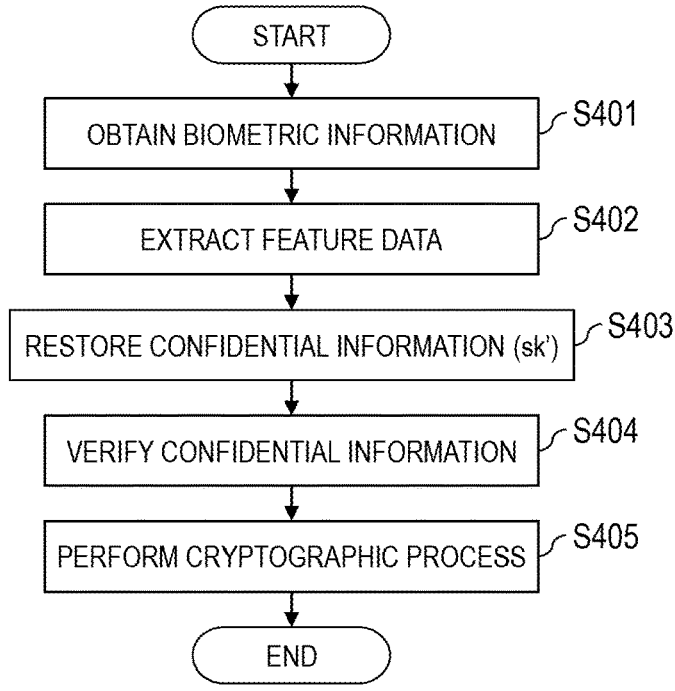
FIG. 4 is a flowchart for explaining verification process performed by an authentication terminal of Embodiment 1.

Next, the verification process of Embodiment 1 will be explained in detail with reference to FIG. 4. FIG. 4 is a flowchart for explaining the verification process performed by the authentication terminal 110 of Embodiment 1.

In a case of receiving an input from a user or operator, the authentication terminal 110 starts the authentication process described below. First, the data obtaining module 111 of the authentication terminal 110 obtains biometric information for verification from the user through the input device 203 (Step S401). The data obtaining module 111 also obtains identification information of the user such as ID and name at the start of the verification process or in the process of obtaining the biometric information for verification.

Next, the feature data extraction module 112 of the authentication terminal 110 extracts feature data for verification from the biometric information for verification (Step S402).

Next, the confidential information restoration module 113 of the authentication terminal 110 obtains the template T from the template DB 122 of the DB server 120, and restores confidential information sk' based on the template T and the feature data for verification (Step S403). The process to restore the confidential information sk' (generation process) will be explained in detail later.

The confidential information restoration module 113 transmits a template obtaining request including the user identification information to the DB server 120 in a case of obtaining the template T. The DB server 120 refers to the template DB 122, searches for a template associated with the user identification information, and transmits the search result to the authentication terminal 110.

Next, the confidential information verification module 114 of the authentication terminal 110 obtains the verification information vk from the verification information DB 123 of the DB server 120, and verifies the authenticity of the confidential information sk' based on the verification information vk (Step S404). That is, the confidential information verification module 114 determines whether sk'=sk is satisfied or not.

Specifically, the confidential information verification module 114 generates the verification information vk' from the confidential information sk', and determines whether the verification information vk' matches the verification information vk obtained from the DB server 120. Examples of the generation method of the verification information vk' include the following methods in accordance with the generation method of the verification information vk.

In a case where the generation method 1 is used, the verification information vk' is given by Formula (17). In a case where the generation method 2 is used, the verification information vk' is given by Formula (18). In a case where the generation method 3 is used, the verification information vk' is given by Formula (19). In Formula (19), "p" is the same value as the value used for generating the verification information vk. The process of Step S404 conducted this way.

Formula 17

$$vk'=\text{Hash}(sk') \tag{17}$$

Formula 18

$$vk'=g\char`\^\varphi(sk') \tag{18}$$

Formula 19

$$vk'=\text{Enc}(sk', p) \tag{19}$$

Next, the authentication terminal 110 performs a cryptographic process based on the verification result of the confidential information sk' (Step S405). Then, the authentication terminal 110 ends the authentication process.

Figure 5:
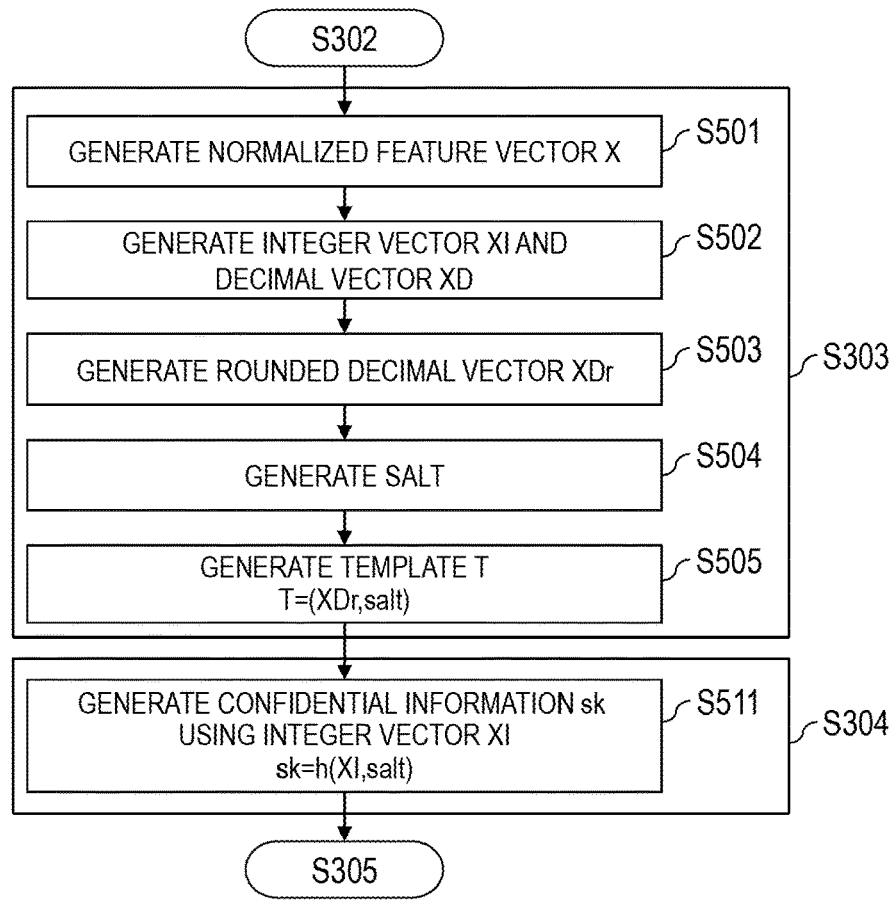
FIG. 5 is a flowchart for explaining process to generate a template T and process to generate confidential information sk in Embodiment 1.

Next, a process to generate the template T and a process to generate the confidential information sk will be explained in detail with reference to FIG. 5. FIG. 5 is a flowchart for explaining the process to generate the template T and the process to generate the confidential information sk in Embodiment 1. In the descriptions below, the value of each element of a vector is represented by the binary system or decimal system.

The template generation module 103 performs at least one of the conversion process or normalization process on the feature data for registration, thereby generating the normalized feature vector X for registration as in Formula (20) (Step S501). Each element X_i of the normalized feature vector X for registration is a real number. If the feature data has already been normalized, the normalization process may be omitted.

Formula 20

$$X=(X\_1, \ldots, X\_n) \tag{20}$$

A normalized feature vector X' for verification, which will be described below, is represented by Formula (21). Each element X'_i of the normalized feature vector X' for verification is a real number.

Formula 21

$$X'=(X'\_1, \ldots, X'\_n) \tag{21}$$

The distance between the two feature vectors X and X' is defined by Formula (22). In this embodiment, if Formula (23) is satisfied, the authentication terminal 110 determines that the two feature vectors X and X' are the feature vectors of the biometric information obtained from the same user.

Formula 22

$$d(X,X')=\max\_i |X\_i-X'\_i| \tag{22}$$

Formula 23

$$d(X,X')<0.5 \tag{23}$$

In Step S501, the template generation module 103 is configured to perform an appropriate conversion process or scaling on the feature vector for registration so that biometric information from the same user satisfies Formula (23)

with high probability, and so that biometric information from different users does not satisfy Formula (23) with high probability.

Next, the template generation module 103 generates an integer vector XI and a decimal vector XD based on the normalized feature vector X for registration (Step S502). The element of the integer vector XI is the integer part of each element X_i, and the element of the decimal vector XD is the decimal part of each element X_i. The integer vector XI and the decimal vector XD are represented by Formula (24) and Formula (25), respectively.

Formula 24

$$XI=(XI\_1, \ldots, XI\_n) \quad (24)$$

Formula 25

$$XD=(XD\_1, \ldots, XD\_n) \quad (25)$$

Specifically, the template generation module 103 generates the integer vector XI by cutting off after the decimal point of the element X_i. The template generation module 103 performs calculation of Formula (26), thereby generating the decimal vector XD.

Formula 26

$$XD\_i=X\_i-XI\_i \quad (26)$$

Next, the template generation module 103 performs a rounding process to round off each element XD_i of the decimal vector XD to the k-th decimal place, thereby generating a rounded decimal vector XDr as in Formula (27) (Step S503).

Formula 27

$$XDr=(XDr\_1, \ldots, XDr\_n) \quad (27)$$

Specifically, the template generation module 103 rounds off the k+1-th decimal place of the element XD_i. This way, the rounded decimal vector XDr in which a value with the k-th decimal place is used for the element thereof is generated. For example, the element XDr_i represented by the binary system has k-digit, or in other words, is k bits, the size of the rounded decimal vector XDr is nk bits.

Examples of the rounding method include rounding up, rounding down, rounding to the nearest point, and even number rounding.

By decreasing the number of digits of the element, the size of the template T can be further reduced. However, if the rounding size is small, the probability of a failed restoration process of the confidential information increases due to an error caused by the rounding process. The relationship between the probability and "k" that specifies the size of rounding will be described later. In the descriptions below, the probability of a failure occurring in the restoration process of confidential information due to an error caused by the rounding process is also referred to as the probability of error.

Next, the template generation module 103 generates a salt (Step S504).

Specifically, the template generation module 103 generates, as a salt, a character string or a bit string of a prescribed length (such as s bits) randomly generated, or a numerical value of a prescribed length randomly generated from an arbitrary numerical range. The template generation module 103 may generate a salt by using a different value for each user or each biometric information for registration, such as a user ID and a counter. The length of the salt needs to be of a size that makes brute force attacks difficult such as 128.

Next, the template generation module 103 generates the template T based on the rounded decimal vector XDr and the salt (Step S505). Specifically, the template generation module 103 generates, as the template, a combination of the rounded decimal vector XDr and the salt as in Formula (28).

Formula 28

$$T=(XDr, \text{salt}) \quad (28)$$

The rounding process is not necessarily performed on the decimal vector XD. Also, the salt is not necessarily used to generate the template T. That is, the template T may be generated from the decimal vector XD or the rounded decimal vector XDr only.

The template generation process is performed as described above. The template generation module 103 registers the template T in the template DB 122 and outputs the integer vector XI and the salt to the confidential information generation module 104.

The confidential information generation module 104 generates the confidential information sk based on the integer vector XI and the salt (Step S511).

For example, the confidential information generation module 104 generates the confidential information sk by inputting data obtained by concatenating the integer vector XI and the salt to the one-way function Hash ( ) such as SHA256 or SHA3 as shown in Formula (29). The symbol "∥" in Formula (29) represents the data concatenation.

Formula 29

$$sk=\text{Hash}(XI\|\text{salt}) \quad (29)$$

Alternatively, the confidential information generation module 104 generates the confidential information sk by inputting the data obtained by concatenating the integer vector XI and the salt and an appropriate parameter p' to a function Enc( ) such as an encryption function such as AES or a keyed hash function as in Formula (30).

Formula 30

$$sk=\text{Enc}(XI\|\text{salt}, p') \quad (30)$$

The confidential information generation process is performed as described above.

Below, the characteristics of the template T of this embodiment will be explained.

As described above, the data size of the rounded decimal vector XDr is nk bits. If the length of the salt is s bits, the size of the template T is (nk+s) bits from Formula (28).

If n=1000, k=8, and s=128, the size of the template T is 8128 bits (1016 bytes), which is approximately 1 kB. Because the size of the template generated based on the technology described in Document 1 is 38.5 kB, the size of the template of this embodiment is approximately 1/40 the size of the conventional template. Because the size of the template can be significantly reduced as compared with the conventional technology, the efficiency of the biometric authentication system improves.

Even if the template T is generated using the decimal vector XD, because the integer part of the feature vector X is deleted, the size of the template T is still sufficiently smaller than the size of the conventional template.

The salt included in the template T is a value that does not depend on biometric information. Therefore, in order for attackers to estimate biometric information from the template T, there is no way other than estimating the normalized feature vector X for registration from the rounded decimal vector XDr included in the template T.

The rounded decimal vector XDr is data generated by rounding the decimal part of the normalized feature vector X for registration. More specifically, the rounded decimal vector XDr is data obtained by deleting the integer part as well as the part after the k+1-th decimal place of the feature vector X. Biometric information always has an error even when it is obtained from the same user, which causes a probable error of a range of ±0.5 in each element of the normalized feature vector X. Thus, because the decimal part includes little information that identifies the user, it is sufficiently difficult to estimate or restore the normalized feature vector X from the rounded decimal vector XDr.

As described above, by applying the method to generate a template of this embodiment, it is possible to reduce the size of a template, and to ensure a sufficient level of safety.

In this embodiment, the template T is generated using the feature vector, but the template T having similar features can be generated using data other than the feature vector. That is, the registration terminal 100 generates error data that is data of an error part generated in biometric information and stationary data that is data other than the error data, based on the feature data or data generated using the feature data. The registration terminal 100 generates the template T using the error data, and generates the confidential information sk using the stationary data.

Figure 6:
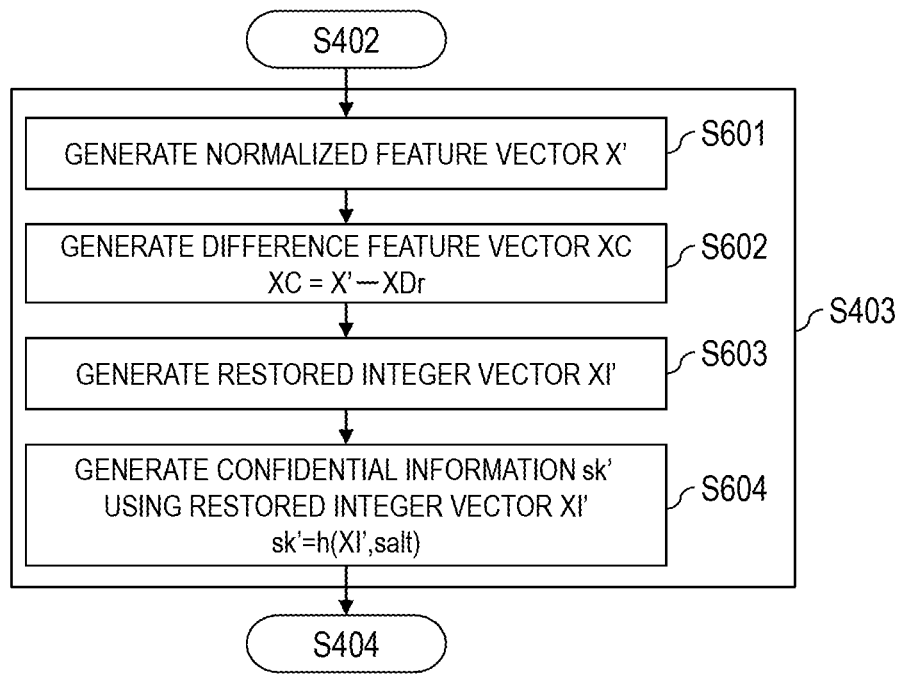
FIG. 6 is a flowchart for explaining restoration process of confidential information sk' of Embodiment 1.

Next, the restoration process of the confidential information sk' will be explained in detail with reference to FIG. 6. FIG. 6 is a flowchart for explaining the restoration process of the confidential information sk' of Embodiment 1.

The confidential information restoration module 113 performs at least one of the conversion process or normalization process on the feature data for verification, thereby generating the normalized feature vector X' for verification as in Formula (21) (Step S601). If the feature data has already been normalized, the normalization process may be omitted.

Next, the confidential information restoration module 113 calculates a difference feature vector XC shown in Formula (31) based on the rounded decimal vector XDr included in the obtained template T and the normalized feature vector X' for verification (Step S602).

Formula 31

$$XC=(XC\_1, \ldots, XC\_n) \tag{31}$$

Specifically, the confidential information restoration module 113 performs an operation of Formula (32).

Formula 32

$$XC=X'-XDr(XC\_i=X'\_i-XDr\_i) \tag{32}$$

Next, the confidential information restoration module 113 generates a restored integer vector XI' shown in Formula (33) based on the difference feature vector XC (Step S603).

Formula 33

$$XI'=(XI'\_1, \ldots, XI'\_n) \tag{33}$$

Specifically, the confidential information restoration module 113 performs an operation of Formula (34). The symbol "[]" represents an operation to extract an integer part by truncating a decimal part of a value in parentheses.

Formula 34

$$XI'\_i=[XC\_i+0.5] \tag{34}$$

Next, the confidential information restoration module 113 generates the restored confidential information sk' based on the restored integer vector XI' and the salt included in the obtained template T (Step S604). The method to generate the confidential information is as described in Step S511.

Below, the verification of the confidential information sk and the restored confidential information sk' will be explained.

Formula (35) defines $\varepsilon\_i$. Here, $\varepsilon\_i$ is a value representing a rounding error of the rounded decimal vector XDr, and the value after the k+1-th decimal place. As a result, the absolute value of $\varepsilon\_i$ is less than $2^{-k}$.

Formula 35

$$\varepsilon\_i=XD\_i-XDr\_i \tag{35}$$

Formula (34) can be transformed to Formula (36) by using Formula (26), Formula (32), and Formula (35).

Formula 36

$$\begin{aligned}XI'\_i &= [XC\_i+0.5] \\ &= [X'\_i-XDr\_i+0.5] \\ &= [X'\_i-(XD\_i-\varepsilon\_i)+0.5] \\ &= [X'\_i-(X\_i-XI\_i-\varepsilon\_i)+0.5] \\ &= [XI\_i-(X\_i-X'\_i+\varepsilon\_i)+0.5]\end{aligned} \tag{36}$$

When the distance defined by Formula (22) satisfies Formula (37), and when $\varepsilon\_i=0$, Formula (38) is always satisfied. Further, Formula (39) is satisfied when Formula (38) is satisfied, because the confidential information sk and sk' are generated from the integer vectors XI and XI' and the salt and methods of the confidential information sk and sk' are same. When Formula (39) is satisfied, the verification information vk and vk' coincide with each other.

Formula 37

$$d(X,X')<0.5 \Leftrightarrow |X\_i-X'\_i|<0.5 \tag{37}$$

Formula 38

$$XI'\_i=XI\_i \tag{38}$$

Formula 39

$$sk=sk' \tag{39}$$

When Formula (37) is satisfied, if $\varepsilon\_i$, which is not zero, is sufficiently small, Formula (38) is highly likely to be satisfied. On the other hand, Formula (38) is not satisfied only when Formula (40) is satisfied. Therefore, the error probability, which is approximately proportional to $2^{-k}$, decreases exponentially as the parameter "k" increases in the rounding process. As a result, if "k" is value between 8 and 16, the accuracy of the verification process is sufficiently high.

Formula 40

$$0.5-2^{-k}<|X\_i-X'\_i|<0.5 \tag{40}$$

Because the size of the template T is proportional to the size of the parameter "k," the value of "k" needs to be determined to achieve desired balance between accuracy and efficiency in the verification process.

As described above, according to this embodiment, the size of the template T can be significantly reduced, and resistance to attacks intended to find the original feature data X from the template T improves. As a result, it is possible to achieve the biometric cryptographic technology with high levels of efficiency and safety.

Following is representing aspects of the present invention other than those described in claims:

(1) A computer for performing a cryptographic process using confidential information to protect data, the computer comprising: a processing unit, a storage device coupled to the processing unit, and an interface coupled to the processing unit, wherein the computer is coupled via the interface to a database configured to manage a template generated based on error feature data indicating an error in first feature data generated from first biometric information, and first verification information generated based on stationary feature data indicating the other part of the feature data than the error feature data, wherein the processing unit is configured to: generate second feature data based on second biometric information obtained from a user in a case where a request to perform the cryptographic process is received; generate second confidential information based on the template and the second feature data; generate second verification information based on the second confidential information; verify the second confidential information by comparing the first verification information and the second verification information; and perform the cryptographic process based on a verification result of the second confidential information.

(2) The computer according to (1), wherein the first feature data and the second feature data are each a feature vector whose elements are real numbers, wherein the error feature data is a vector whose elements are a decimal part of elements of the feature vector, and wherein the stationary feature data is a vector whose elements are an integer part of elements of the feature vector.

(3) The computer according to (2), wherein the processing unit is configured to: generate stationary feature data of the second biometric information, based on the second feature data and the error feature data of the first biometric information included in the template; and generate the second confidential information by inputting the stationary feature data of the second biometric information into at least one of a hash function, a keyed hush function, and a cryptographic function.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising at least one computer, the at least one computer including a processing unit, and a storage device coupled to the processing unit, and the processing unit being configured to:
generate first feature data based on first biometric information obtained from a user;
generate error feature data indicating an error in the first biometric information and stationary feature data indicating part other than the error in the first biometric information, based on the first feature data;
generate a template based on the error feature data of the first biometric information, and store, in the storage device, identification information of the user associated with the template;
generate first confidential information used for a cryptographic process based on the stationary feature data of the first biometric information, generate first verification information based on the first confidential information, and store, in the storage device, the identification information of the user associated with the first verification information;
generate second feature data based on second biometric information obtained from a user in a case where a request to perform the cryptographic process is received;
generate second confidential information based on the template and the second feature data;
generate second verification information based on the second confidential information;
verify the second confidential information by comparing the second verification information with the first verification information; and
perform the cryptographic process based on a verification result of the second confidential information.

2. The computer system according to claim 1,
wherein the first feature data and the second feature data are each a feature vector whose elements are real numbers,
wherein the error feature data is a vector whose elements are a decimal part of elements of the feature vector, and
wherein the stationary feature data is a vector whose elements are an integer part of elements of the feature vector.

3. The computer system according to claim 2,
wherein the processing unit is configured to:
perform a rounding process to round a value of each element of the error feature data; and
generate the error feature data of the first biometric information performed the rounding process as the template.

4. The computer system according to claim 2,
wherein the processing unit is configured to:
generate a salt that is a data string of a prescribed length; and generate a pair of the salt and the error feature data of the first biometric information performed the rounding process as the template.

5. The computer system according to claim 2, wherein the processing unit is configured to:
  generate the first confidential information by inputting the stationary feature data of the first biometric information into at least one of a hash function, a keyed hash function, and a cryptographic function;
  generate stationary feature data of the second biometric information, based on the second feature data and the error feature data of the first biometric information included in the template; and generate the second confidential information by inputting the stationary feature data of the second biometric information into at least one of the hash function, the keyed hash function, and the cryptographic function.

6. A verification method of confidential information executed by a computer system that performs cryptographic process using the confidential information, the computer system including at least one computer that has a processing unit and a storage device coupled to the processing unit, the method comprising:
  a first step of generating, by the processing unit, first feature data based on first biometric information obtained from a user;
  a second step of generating, by the processing unit, error feature data indicating an error in the first biometric information and stationary feature data indicating part other than the error in the first biometric information, based on the first feature data;
  a third step of generating, by the processing unit, a template based on the error feature data of the first biometric information, and storing, in the storage device, identification information of the user associated with the template;
  a fourth step of generating, by the processing unit, first confidential information used for the cryptographic process based on the stationary feature data of the first biometric information, generating first verification information based on the first confidential information, and storing, in the storage device, the identification information of the user associated with the first verification information;
  a fifth step of generating, by the processing unit, second feature data based on second biometric information obtained from a user in a case where a request to perform the cryptographic process is received;
  a sixth step of generating, by the processing unit, second confidential information based on the template and the second feature data;
  a seventh step of generating, by the processing unit, second verification information based on the second confidential information;
  an eighth step of verifying, by the processing unit, the second confidential information by comparing the second verification information with the first verification information; and
  a ninth step of performing, by the processing unit, the cryptographic process based on a verification result of the second confidential information.

7. The verification method of confidential information according to claim 6,
  wherein the first feature data and the second feature data are each a feature vector whose elements are real numbers,
  wherein the error feature data is a vector whose elements are a decimal part of elements of the feature vector, and
  wherein the stationary feature data is a vector whose elements are an integer part of elements of the feature vector.

8. The verification method of confidential information according to claim 7,
  wherein the third step includes:
  a step of performing, by the processing unit, a rounding process to round a value of each element of the error feature data; and
  a step of generating, by the processing unit, the error feature data of the first biometric information performed the rounding process as the template.

9. The verification method of confidential information according to claim 7,
  wherein the third step includes:
  a step of generating, by the processing unit, a salt that is a data string of a prescribed length; and
  a step of generating, by the processing unit, a pair of the salt and the error feature data of first biometric information performed the rounding process as the template.

10. The verification method of confidential information according to claim 7, wherein the fourth step includes a step of generating, by the processing unit, the first confidential information by inputting the stationary feature data of the first biometric information into at least one of a hash function, a keyed hash function, and a cryptographic function, and wherein the sixth step includes:
  a step of generating, by the processing unit, stationary feature data of the second biometric information, based on the second feature data and the error feature data of the first biometric information included in the template; and
  a step of generating, by the processing unit, the second confidential information by inputting the stationary feature data of the second biometric information into at least one of the hash function, the keyed hash function, and the cryptographic function.

11. A computer for generating a template used to generate confidential information to protect data, the computer comprising:
  a processing unit; and
  a storage device coupled to the processing unit,
  the processing unit being configured to:
  generate first feature data based on first biometric information obtained from a user;
  generate error feature data indicating an error in the first biometric information and stationary feature data indicating part other than the error in the first biometric information, based on the first feature data;
  perform a rounding process to round a value of each element of the error feature data;
  generate a salt that is a data string of a prescribed length;
  generate a template used to generate second confidential information to be verified based on the salt and the error feature data of the first biometric information performed the rounding process, and store the template associated with identification information of the user in the storage device; and
  generate first confidential information based on the stationary feature data of the first biometric information, generate verification information used to verify the second confidential information based on the first confidential information, and store, in the storage device, the identification information of the user associated with the verification information.

12. The computer according to claim 11,
wherein the first feature data is a feature vector whose elements are real numbers,
wherein the error feature data is a vector whose elements are a decimal part of elements of the feature vector, and
wherein the stationary feature data is a vector whose elements are an integer part of elements of the feature vector.

\* \* \* \* \*